(12) United States Patent
Jefferson et al.

(10) Patent No.: US 6,199,512 B1
(45) Date of Patent: Mar. 13, 2001

(54) PIGLET MILK-FEED DELIVERY SYSTEM

(75) Inventors: Wayne A. Jefferson, Simpsonville; Alan M. Kapp, Greer, both of SC (US)

(73) Assignee: Liquid Systems, Inc., Simpsonville, SC (US)

(*) Notice: Subject to any disclaimer, the term of this patent is extended or adjusted under 35 U.S.C. 154(b) by 0 days.

(21) Appl. No.: 09/361,059

(22) Filed: Jul. 26, 1999

Related U.S. Application Data

(60) Provisional application No. 60/094,216, filed on Jul. 27, 1998.

(51) Int. Cl.$^7$ .............................. A01K 7/02; A01K 7/04
(52) U.S. Cl. .............................. 119/74; 119/78; 119/51.5
(58) Field of Search .............................. 119/51.5, 72, 74, 119/78, 79, 80, 61, 71

(56) References Cited

U.S. PATENT DOCUMENTS

| | | | |
|---|---|---|---|
| 2,972,979 | * | 2/1961 | Strrek .................................. 119/51.5 |
| 3,124,105 | * | 3/1964 | Stapleton .............................. 119/61 |
| 3,265,036 | * | 8/1966 | Kloss .................................. 119/57.2 |
| 3,473,516 | * | 10/1969 | Legrain .................................. 119/71 |
| 3,625,183 | * | 12/1971 | Tartar .................................. 119/51.11 |
| 3,664,302 | * | 5/1972 | Wienert .................................. 119/457 |
| 3,738,532 | * | 6/1973 | Fimbault .................................. 222/63 |
| 3,776,192 | * | 12/1973 | Stamps et al. ...................... 119/51.11 |
| 4,181,097 | * | 1/1980 | Betsuno .............................. 119/51.11 |
| 4,620,505 | * | 11/1986 | Thomson et al. ................. 119/51.11 |
| 4,640,229 | * | 2/1987 | Swartzendruber et al. ...... 119/51.11 |
| 4,803,955 | * | 2/1989 | Gonsalves .............................. 119/71 |
| 5,033,412 | * | 7/1991 | Brennan et al. ...................... 119/72 |
| 5,067,443 | * | 11/1991 | Hurnik et al. .......................... 119/71 |
| 5,074,248 | * | 12/1991 | Loader .................................. 119/505 |
| 5,138,980 | * | 8/1992 | Ewing .................................. 119/73 |
| 5,143,257 | * | 9/1992 | Austin et al. .......................... 222/57 |
| 5,205,240 | * | 4/1993 | Colas et al. .......................... 119/57.4 |
| 5,255,632 | * | 10/1993 | Thomas et al. ...................... 119/51.5 |
| 5,311,838 | * | 5/1994 | Thomas et al. ...................... 119/51.5 |
| 5,335,625 | * | 8/1994 | Rawlings et al. ...................... 119/74 |
| 5,355,833 | * | 10/1994 | Legrain .............................. 119/51.02 |

* cited by examiner

Primary Examiner—Michael J. Carone
Assistant Examiner—James S. Bergin
(74) Attorney, Agent, or Firm—Dority & Manning, P.A.

(57) ABSTRACT

A method for orally administering feed supplements to a plurality of animal feed stations, and an apparatus for accomplishing the method are disclosed. A feed reservoir is separately connected to the feed station via a tube and is dispensed into a feed trough through a plurality of spray nozzles, providing essentially unlimited supplemental feed. The apparatus also comprises separator plates, such that individual feeding stations result. Additionally, a method of disinfecting and rinsing the apparatus is provided.

17 Claims, 6 Drawing Sheets

US 6,199,512 B1

PIGLET MILK-FEED DELIVERY SYSTEM

This application claims the benefit of priority from U.S. Provisional patent application Ser. No. 60/094,216, filed Jul. 27, 1998.

FIELD OF THE INVENTION

The present invention relates to a method for the delivery of feed to domestic animals and an apparatus for accomplishing the same. Specifically, the present invention is directed to a method for the delivery of substantially unlimited amounts of supplemental feed solution to each of a plurality of feed stations. This invention further relates to an apparatus for accomplishing this method. The apparatus can include, for instance, a common source feed reservoir connected to a plurality of animal feed stations.

BACKGROUND OF THE INVENTION

Domestic pork production has become a major industry in the United States, with a gradual change from small family-run businesses to large commercial operations. Commercialization offers several advantages including efficiency and cost effective production methods. However, for commercial production practices to remain economically feasible, piglets must be moved through production cycles as a unit that is, piglets must be weaned at the same time, and moved to grow-out pens at the same time.

In commercial pork operations, it is not uncommon for as many as 20% of the piglets born to be classified as runts on the basis of birth weight or their failure to thrive. Runts are a problem for the pork producer both because they carry disease and represent a loss of income for the producer. Ten percent of these piglets may die, and it is not uncommon for the pork producer to kill the others because of a lack of feasible alternatives to bring these runts up to a weight similar to that of their litter mates.

It is therefore desirable to provide a system which would deliver milk-feed or other supplemental diets to runts, thus allowing the piglets to gain weight and be reintroduced into the litter-group.

SUMMARY OF THE INVENTION

The present invention recognizes and addresses the foregoing disadvantages, and others as prior art constructions and methods.

Accordingly, it is an object of the present invention to provide an efficient method for the administration of supplemental feed to livestock, and an apparatus for accomplishing the same.

A further object of the present invention is to provide an efficient method for the administration to piglets of feed supplements, including powdered milk, vitamin and mineral supplements and growth supplements, among others, and an apparatus for accomplishing the same.

Yet another object of the present invention is to provide an efficient method for the administration of supplemental milk feed to piglets having improved sterility conditions, and an apparatus for accomplishing the same.

A still further object of the present invention is to provide an efficient method for the administration to piglets of feed supplements, in which such supplements are administered at an unlimited rate, and an apparatus for accomplishing the same.

Another object of the present invention is to provide an efficient method for the administration to piglets of a feed supplement and an apparatus for accomplishing the same, such that the apparatus is self-cleaning and self-disinfecting.

These and other objects of the present invention are achieved by providing a method for administering feed supplements, such as powdered milk, medicaments, growth supplements, mineral supplements, and vitamin supplements, among others, to domesticated animals. As used herein, domesticated animals include animals raised as livestock, such as piglets. The method includes an apparatus comprising individual feed stations, such that many piglets may feed simultaneously.

More particularly, the present invention is directed to a method for the delivery of feed to piglets and to an apparatus for accomplishing the same. Specifically, the present invention is directed to a method for the delivery of substantially unlimited amounts of milk and other supplemental feed through a plurality of feed stations. The apparatus allows for supplemental feeding of runts, such that the runts are provided with essentially unlimited amounts of milk or other supplemental feed. The supplemental feed provided by this method allows the runt piglets to gain weight at an increased rate, such that the runts can be reintroduced to their litter mates and complete the grow-out cycle.

The apparatus can be designated to be self-cleaning and can include a disinfecting system, such that at regular intervals the feeding station and feed trough can be rinsed with disinfecting solution. The feed trough and feed stations are subsequently rinsed with water prior to being refilled with supplemental feed.

One problem experienced in the past is that many prior art feeding systems can become dirty and contaminated. In particular, many prior art feeding devices are designed to rest on the ground, which unfortunately makes the feeding devices susceptible to being contaminated. For example, one particular problem experienced in these systems is that the animals have a tendency to step into the reservoirs where the feed is kept.

The feeding system of the present invention, on the other hand, is designed not only to make a feed supplement continuously available to the animals, but is also designed to prevent contamination of the feed supply. In this regard, the apparatus includes a feeding trough which is designed to be suspended above the ground so only the mouth of the animals has access to the feed.

For instance, the feed apparatus can include a trough having separated feeding stations that include a mechanism for varying the size of the feeding stations. By means of this mechanism, only the mouth and jaws of the piglet enter the food source, thus preventing contamination of the supplemental feed. For example, this mechanism can comprise a rod which fits into a series of alternating slots, such that the opening for the pig's head is increasingly enlarged. By means of this rod and slot mechanism, the opening for the piglets can be increased or decreased to prevent the entry of more than the mouth and jaw parts.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying Figures, in which.

Figure 1:
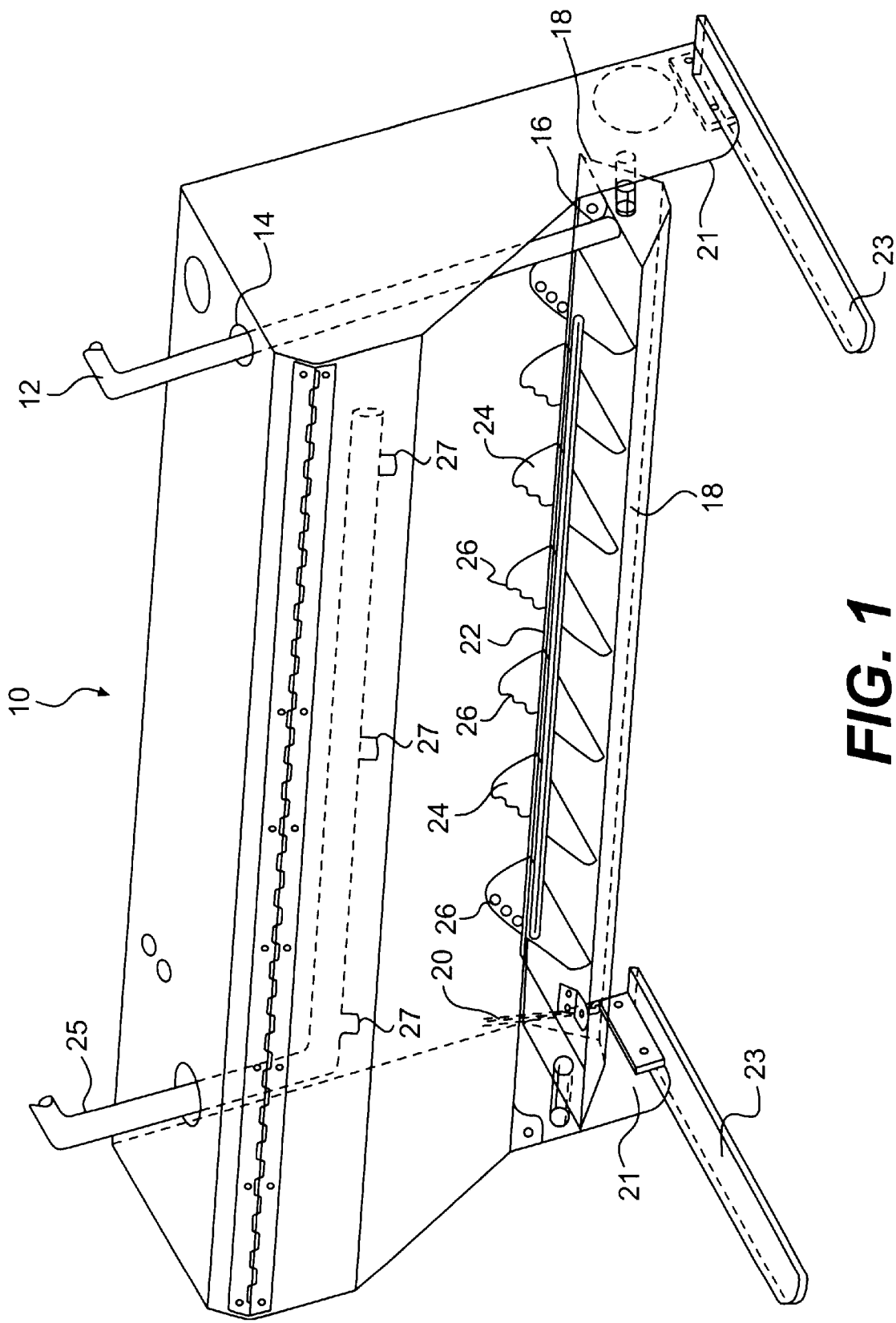
FIG. 1 is a perspective view of one embodiment of an apparatus of the present invention for administering feed supplements to domesticated animals in accordance with the teachings of the present invention.

Repeat use of reference characters in the present specification and drawings is intended to represent same or analogous features of elements of the invention.

DETAILED DESCRIPTION OF PREFERRED EMBODIMENTS

It is to be understood by one of skill in the art that the present discussion is a description of exemplary embodiments only, and is not intended as limiting the broader aspects of the present invention, which broader aspects are embodied in the exemplary construction.

The present invention is generally directed to a method for the delivery of feed supplements at a substantially unlimited rate to each of a plurality of domestic animal feed-stations. The inventive method further has the attendant advantages of increased sterility and increased protection from adverse environmental conditions in the delivery of feed.

This invention further relates to an apparatus for accomplishing this method. The apparatus includes a common source reservoir connected to a plurality of animal feed stations in such a manner to accomplish the above-described conditions relating to sterility, environmental shielding, and feed rate.

Although the system of the present invention is designed to supply to domesticated animals any liquid feed, in one preferred embodiment, the system is used to supply powdered milk to piglets. For example, in one embodiment, the system includes a mixing tank in communication with a hopper for holding a dry feed supplement and a water source. The mixing tank is designed to mix powdered milk with water. A pump is then used to pump the mixed solution from the mixing tank to one or more piglet pens. A recirculation line can be included for pumping the powdered milk solution back to the mixing tank if desired.

A feeding apparatus is contained in each piglet pen for supplying the feed solution to the piglets. The feeding apparatus can include, for instance, a housing containing a trough for holding the feed solution. The feeding apparatus can further include a level switch and spray nozzles for not only maintaining a predefined amount of feed solutions in the trough, but also for cleaning and disinfecting the trough at periodic intervals.

For instance, the level switch can be used to sense the feed solution level in the trough and can send that information to a controller. The controller can be in electrical communication with a valve that controls the amount of feed solution being fed to the trough. For example, when the feed solution is supplied to the trough, a level switch can be used to determine when the trough is full or, alternatively, a timer can be used to start the flow of the solution and to stop the flow after a predetermined amount of time.

As described above, preferably the feeding apparatus is washed and disinfected at periodic intervals. In this regard, the feeding apparatus can include spray nozzles which direct water and/or a disinfectant solution into the trough. For example, in one embodiment, the spray nozzles can direct water to clean the trough. After an initial wash, a disinfectant, such as a very dilute bleach, can then be injected into the water. After rinsing the apparatus with the bleach, the apparatus is then once again rinsed with water.

According to the present invention, the feeding apparatus can be shaped to prevent piglets from contaminating the feed solution. For instance, preferably the feeding apparatus is suspended above the ground to prevent the piglets from stepping into the feed solution.

In still another alternative embodiment, a bar can be placed above the trough which prevents the piglets from putting more than their mouth in the trough. The bar can be adjustable for increasing the size of the opening as the piglets increase in size.

Referring now to FIG. 1, there is illustrated a diagrammatic view of one embodiment of a feeding apparatus 10 for orally administering supplemental feed to domesticated animals in accordance with the present invention. As illustrated in FIG. 1, the apparatus 10 includes a tube 12, which is placed in communication with a reservoir containing a feed supplement. Tube 12 communicates through an opening 14 in the apparatus and empties on a distal end 16 into a feed trough 18. The feed supplement, which can be, for instance, a powdered milk solution, can be fed through tube 12 into feed trough 18 by the force of gravity or, alternatively, the use of a pump. Feed trough 18 dispenses the feed solution to the animals. In particular, the animals can drink from feed trough 18 along one side as shown in the figure or, alternatively can feed from both sides of the trough.

In this embodiment, in order to monitor the amount of feed solution contained within feed trough 18, apparatus 10 includes a level indicating device 20. Level indicating device 20 comprises a float switch and can be used to control the amount of feed supplement released into the feed trough 18. When the level of feed supplement in the trough has decreased, the float switch opens a valve and feed is released into the feed trough 18.

Besides using a float switch, level indicating device 20 can include other devices and sensors. For instance, in an alternative embodiment, level indicating device 20 can comprise an electrical sensing device which can include two sensors. The first sensor can indicate a low liquid level within trough 18 and therefore can be used to indicate when it is necessary to add more feed supplement into the trough. The second sensor, on the other hand, can indicate when the trough is full and can be used to stop the flow of the feed supplement to the trough.

The feed apparatus 10 also contains a plurality of separator plates 24, wherein each plate 24 contains a plurality of slots 26 for receiving a bar 22. In particular, the bar 22 may be raised or lowered with respect to the trough depending upon which of the slots 26 bar 22 is placed. Separator plates 24 form separate and distinct feeding zones for different piglets feeding from trough 18. Bar 22, on the other hand, is for preventing the piglets from placing anything besides their mouth into trough 18. Specifically, bar 22 can be adjusted depending upon the size of the piglets for forming openings only large enough to receive a pig's snout. As shown, bar 22 is adjustable for making the individual openings larger as the pigs grow. Bar 22, however, may not be necessary depending on the shape of trough 18.

Figure 2:
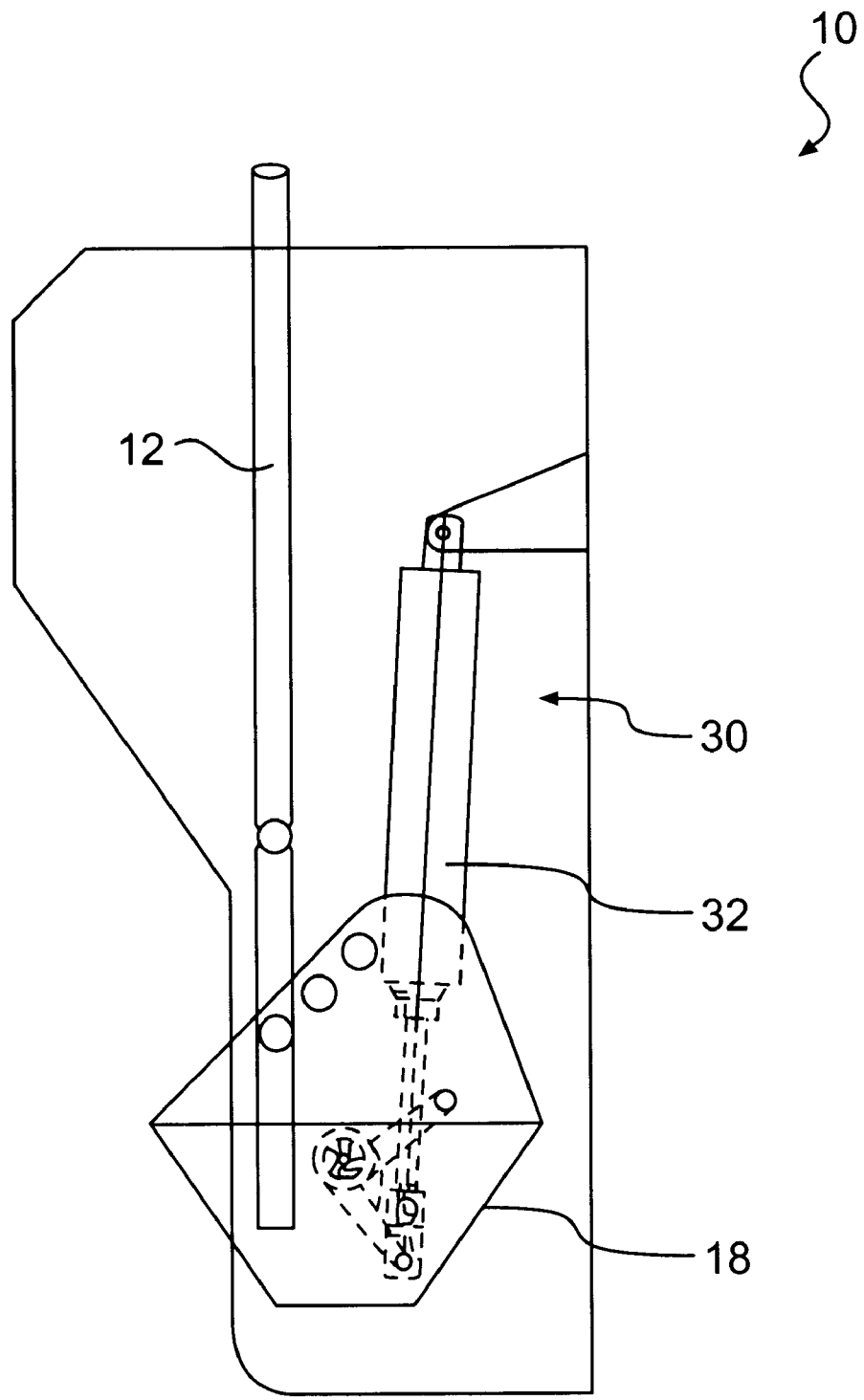
FIG. 2 is a cross-sectional view of the device shown in FIG. 1.

As illustrated in FIG. 2, feeding apparatus 10 further includes a drive mechanism 30. Drive mechanism 30 includes a cylinder 32, such as a pneumatic cylinder. When activated, cylinder 32 forces feed trough 18 to tilt, causing the contents of feed trough 18 to empty by the force of gravity.

Drive mechanism 30 can be used, for instance, to empty any feed solution contained within feed trough 18 after a period of time. When feed trough 18 is rinsed with water and/or a disinfectant solution drive mechanism 30 can also be used to drain trough 18.

Drive mechanism 30 can be designed to tilt trough 18 one way or both ways if desired. In one preferred embodiment, drive mechanism 30 is configured to tilt the trough so that not only the inside of the trough is sprayed and rinsed with a cleaning solution, but that the underside of the trough is sprayed and rinsed as well.

It should be understood, however, that feed trough 18 can be emptied according to other methods, besides being tilted or tipped by a drive mechanism. For instance, in an alternative embodiment, a gravity drain connected to a valve can be installed along the bottom of trough 18. Trough 18 can be designed so that fluids contained within the trough are directed towards the drain. In this embodiment, the valve can be used to control when the fluid contents contained within the trough are drained.

Referring to FIG. 1, in order to rinse feeding apparatus 10 with water and/or a disinfectant solution, apparatus 10 includes a rinse line 25. Rinse line 25 can be connected to a water source and/or a reservoir containing a disinfectant solution. As shown, rinse line 25 includes a plurality of nozzles 27. When water or a disinfectant solution is fed through rinse line 25, nozzles 27 release the fluid into the apparatus according to a designed spray pattern. In this manner, feeding trough 18 and the other pieces of equipment contained within apparatus 10 are rinsed.

In order to suspend feeding trough 18 above the ground, feeding apparatus 10 includes legs 21 which are attached to base plates 23. Legs 21 can be, in one embodiment, adjustable for adjusting the height of the trough and for maintaining the trough level. As described above, preferably feed trough 18 is maintained generally at a level consistent with the height of a pig's snout. By maintaining the trough elevated off the ground, the feed solution is less likely to become contaminated. It should be understood, however, that besides legs 21, there are many other methods for maintaining trough 18 suspended. For instance, in an alternative embodiment, apparatus 10 can be mounted to a wall.

Figure 3:
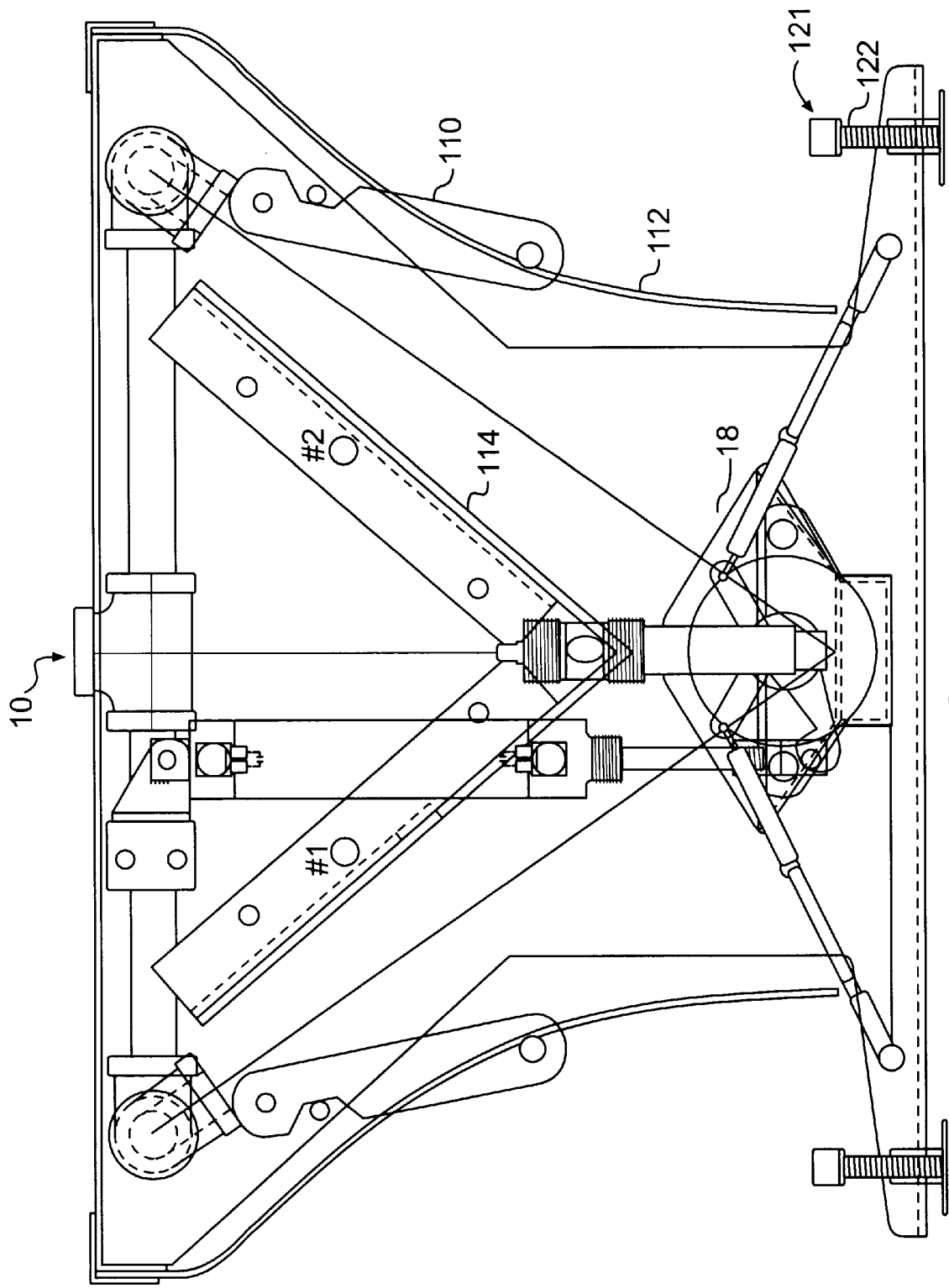
FIG. 3 is a cross-sectional view of the left end of another embodiment of an apparatus made in accordance with the present invention.

Referring now to FIG. 3, another embodiment of feeding apparatus 10 is illustrated. The double feeder system illustrated in FIG. 3 is designed to allow piglets to feed from either side of the trough. Feeding apparatus 10, as shown in FIG. 3, further includes pivot bar 110 and curtain 112. Curtain 112 is suspended from pivot bar 110 to hang in front of trough 18. Curtain 112 serves to limit access to trough 18, thereby protecting contents of trough 18 from adverse environmental contaminants. When a piglet applies inward force to curtain 112, by pushing curtain 112 with its snout, pivot bar 110 pivots curtain 112 in an inward direction to allow the piglet access to feeder 18. When the piglet retracts its head from trough 18, pivot bar 110 permits curtain 112 to pivot into original position.

Curtain 112 can be made from any material suitable for providing a light-weight, durable curtain which will protect trough 18 from contamination, while simultaneously permitting the curtain to move in response to contact from a piglet's snout. For example, plastics such as polyethylene and polypropylene are suitable for constructing curtain 112. However, one of skill in the art will recognize that other suitable materials exist from which curtain 112 may be manufactured.

Also as illustrated in FIG. 3, feeder assembly 10 may further include legs 121, having a threaded portion 122. Engaging threaded portion 122 raises feeding apparatus 10, while disengaging threaded portion 122 lowers feeding apparatus 10, thus providing a mechanism by which feeder apparatus 10 can be leveled.

Feeder assembly 10 further includes screen 114, as shown in FIG. 3. Screen 114 prevents the passage of piglets from one side of feeder assembly 10 to the other side.

Figure 4:
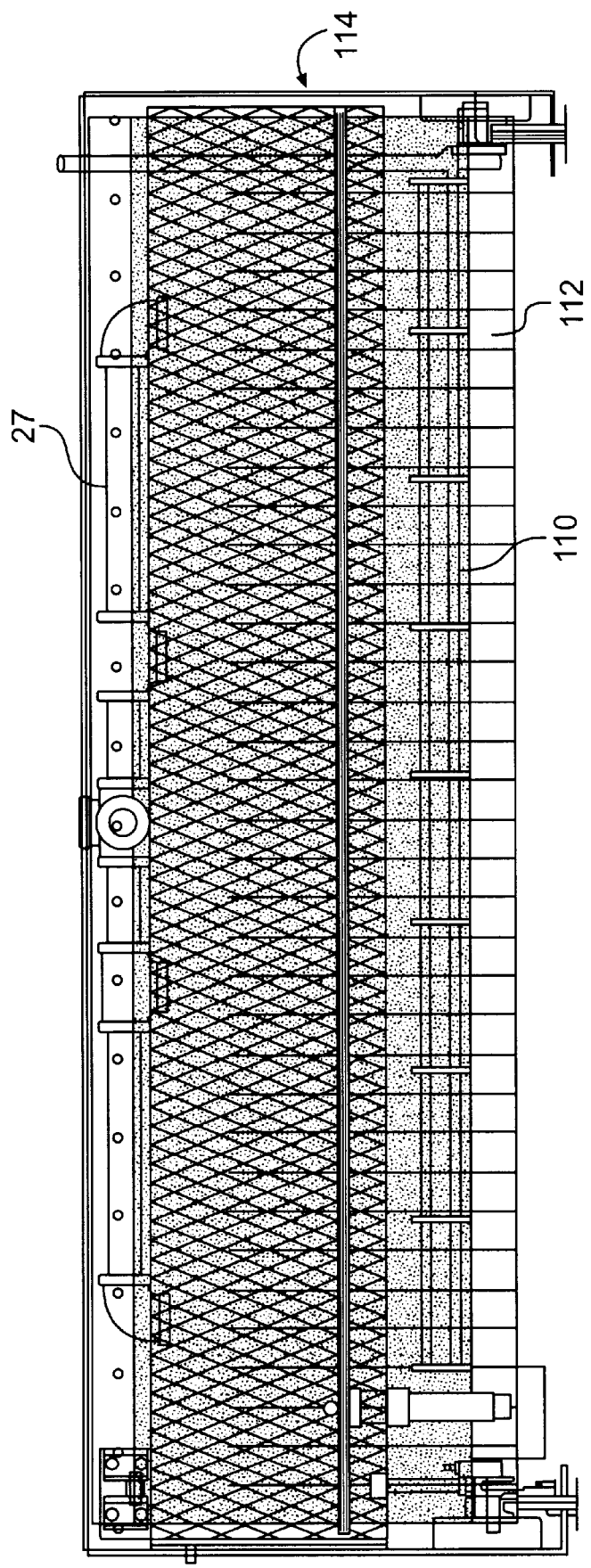
FIG. 4 is a side view of the device shown in FIG. 3.

Looking now at FIG. 4, a side view of the double feeder device of FIG. 3 is shown, illustrating screen 114, spray nozzles 27, curtain 112, and pivot bar 110. According to the present invention, screen 114 may be made of aluminum, steel, plastic, or any other material which is easily cleaned and disinfected, while durable enough to prevent entry of piglets into the opposite side of feeder 10.

Figure 5:
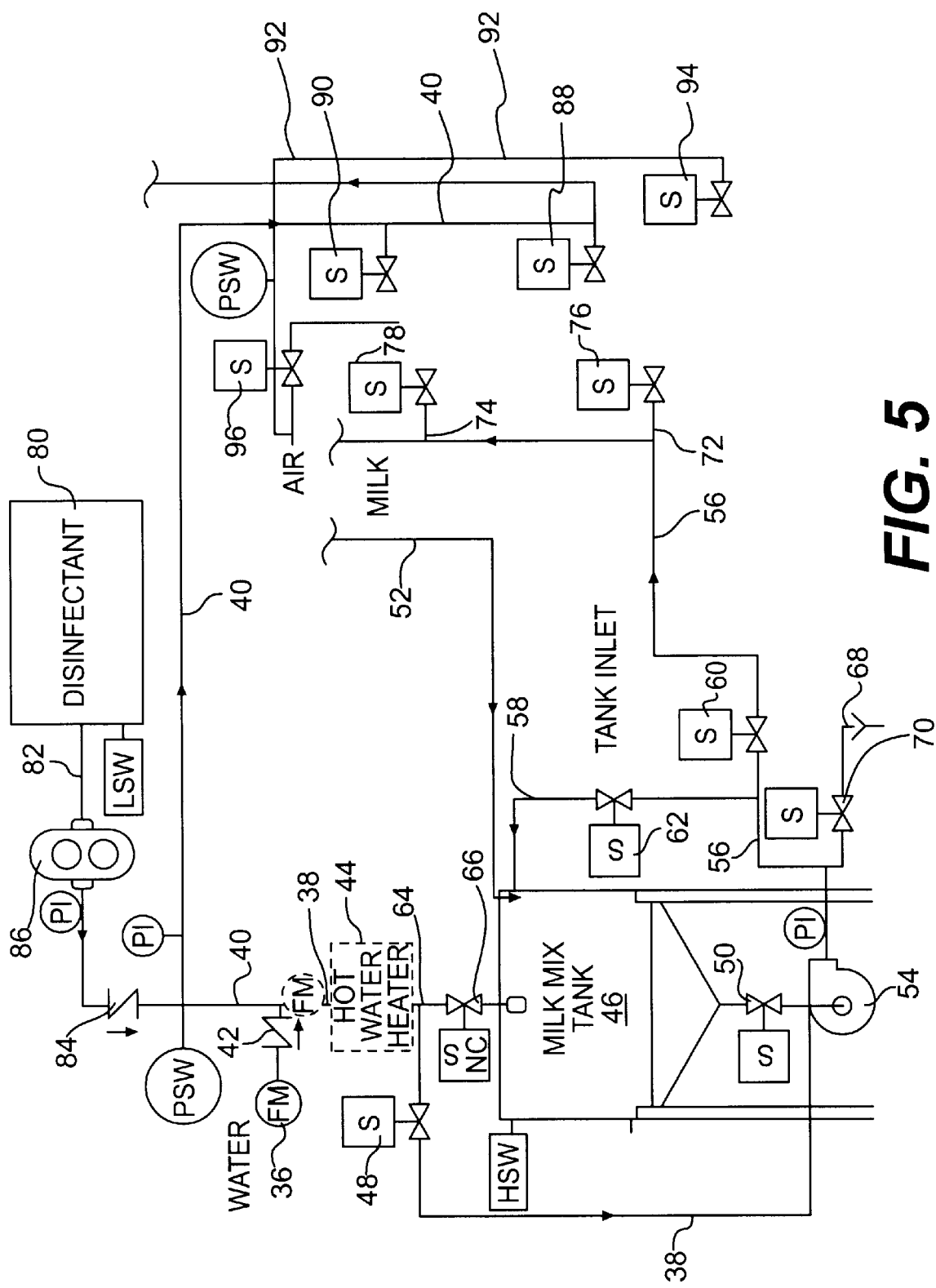
FIG. 5 is a flow chart showing the operation of one embodiment of a feed delivery system made in accordance with the present invention.

Referring to FIG. 5, one embodiment of a feed solution system incorporating feeding apparatus 10 as illustrated in FIGS. 1 and 3 is shown. The system illustrated in FIG. 5 is designed to formulate a powdered milk solution and to send the solution to a plurality of feed stations comprising the feeding apparatus of the present invention. This system also includes a disinfectant system for cleaning the feeding apparatuses as desired.

As shown, a flow meter 36 measures predetermined amounts of water from a water source. From the water source, the water can be fed into a water line 38 or into a rinse line 40. The flow of water from the water source is controlled by a valve 42.

When formulating a powdered milk solution, the water is directed into water line 38 and is heated by hot water heater 44 prior to being introduced into a mix tank 46. The flow of water into mix tank 46 can be controlled by valve 48 or by valve 50.

A powdered milk supply 52 is also in communication with mix tank 46. Powdered milk supply 52 is designed to feed predetermined amounts of a powdered milk into the tank. Within mix tank 46, the water and the powdered milk are blended into a feed solution.

Once blended, the powdered milk solution can be pumped from mix tank 46 using pump 54. In particular, pump 54 can direct the solution into a feed line 56 or into a recirculation line 58 through the use of valves 60 and 62. Recirculation line 58 is provided so that the solution can be circulated to and from the mix tank in order to maintain the solution in a mixed state when the powdered milk solution is not being fed to the feeding apparatuses.

In order to clean mix tank 46 when desired, the system further includes a tank rinse line 64 and a valve 66 which are designed to spray water into the tank when desired. Also, a drain line 68 and valve 70 are provided in order to empty the rinse solution or to otherwise dispose of any unwanted solution contained within mix tank 46.

In this embodiment, feed line 56 is in communication with a first feeding apparatus and a second feeding apparatus, which are labeled Feeder 1 and Feeder 2 in the diagram. As shown, the powdered milk solution is fed to the feeding apparatuses via a first fill line 72 and a second fill line 74. The flow of the powdered milk solution is controlled to the feeders using valves 76 and 78.

In order to clean Feeder 1 and Feeder 2 periodically, the system illustrated in FIG. 5 further includes a disinfectant and rinse subsystem. In particular, the system includes a disinfectant reservoir 80 in communication with a disinfectant line 82 and a pump 86. The flow of a disinfectant from reservoir 80 is controlled by a valve 84. Valve 84 can be, for instance, a needle valve and can be used to monitor the amount of disinfectant being dispensed from reservoir 80. Alternatively, however, a flow meter can also be used.

As shown, disinfectant line 82 empties into rinse line 40. Rinse line 40, in turn, is in communication with a first nozzle that forms a part of Feeder 1 and a second nozzle that forms a part of Feeder 2. Nozzles 1 and 2 are for spraying either water or a disinfectant solution into the feeding apparatuses. The flow of cleaning solution to the feeding apparatuses is controlled by valves 88 and 90.

In accordance with the present invention, the feeding apparatuses can be cleaned and rinsed according to periodic intervals or at any desired time. For most applications, it is preferred to contact the feeding apparatus with a first rinse of water, followed by a second rinse of the disinfectant solution, and then in turn followed by a third rinse of water.

As described above, each feeding apparatus includes a feeding trough from which the domesticated animals ingests the feeding solution. When it is necessary to empty the contents of the trough, the system can include a mechanism that tilts the trough when desired. In this regard, the system in FIG. 5 includes a pressurized air line 92 in communication with a first tilt valve 94 and a second tilt valve 96. Tilt valves 94 and 96 are air actuated cylinders that are designed to tilt the feeding troughs for draining the contents. Tilt valves 94 and 96, for instance, are used during the cleaning process in order to rinse and refill the trough.

Figure 6:
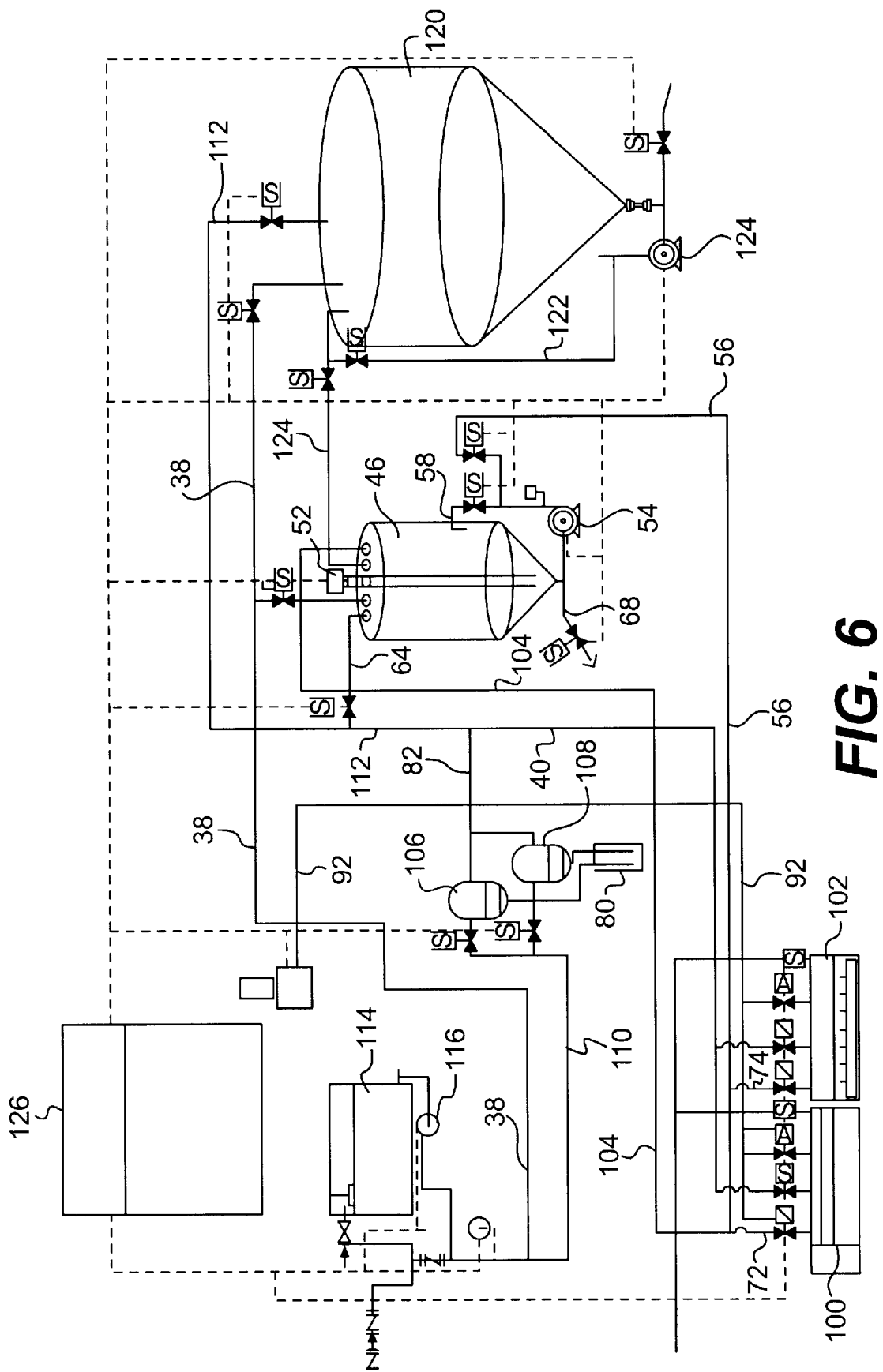
FIG. 6 is a flow chart schematically showing the electrical and mechanical connections of a feed delivery system made in accordance with the present invention.

Referring to FIG. 6, another embodiment of a piglet feeding system is illustrated. Like character numerals have been used in comparison to the embodiment shown in FIG. 5 in order to represent similar elements of the system. Specifically, the system in FIG. 6 includes a water line 38, a pattern milk supply 52 and a mix tank 46 for formulating a powdered milk solution. The powdered milk solution can be pumped from mixed tanks 46 using a pump 54 for dispensing the solution into a feed line 56 which is in communication with a first feeding apparatus 100 and a second feeding apparatus 102. In this embodiment, the system further includes a return feed solution line 104 in communication with fed line 56 for bypassing the feeding apparatuses and recirculating the feed solution back into mix tank 46.

Similar to FIG. 5, the system in FIG. 6 includes a disinfectant reservoir 80 in communication with a disinfectant line 82 for rinsing and cleaning the mix tank and the feeding apparatuses. In this embodiment, the system includes a first cleaning solution tank 106 and a second cleaning solution tank 108 which are both in communication with disinfectant reservoir 80 and a water line 110. Cleaning solution tanks 106 and 108 are designed to mix preselected amounts of a disinfectant, such as bleach, with water flowing through line 110. Specifically, the cleaning solution tanks use hydraulic pressure in order to control the amount of disinfectant being added to the water. Thus, the water and disinfectant are blended without having to use a pump.

The mixed cleaning solution enters disinfectant line 82 and is then sent to either the feeding apparatuses using rinse line 40 or to the illustrated mixing tanks using rinse line 112.

In the system illustrated in FIG. 6, a water storage tank 114 is included in communication with a booster pump 116. Water storage tank 114 and booster pump 116 are included in the system in order to maintain appropriate water pressure within the system if needed. Depending upon the water source connected to the system, however, tank 114 and pump 116 may not be necessary.

As shown, the system further includes a second mix tank 120 in addition to mix tank 46. Mix tank 120 is in communication with a recirculation line 122 and a pump 124 for continuously circulating a feed solution. A transfer line 124 is further included for transferring a feed solution between the mix tanks.

Second mix tank 120 is included in the system in order to ensure that there is a continuous supply of feed solution to the feeding apparatuses. For instance, mix tank 46 can be used to formulate a feed solution which can then be stored in mix tank 120 or vice versus. Consequently, while one mix tank is dispensing a feed solution, the other mix tank can be formulating a feed solution. In the embodiment illustrated in FIG. 6, mix tank 120 is primarily used to store and mix an already formulated feed solution. Further piping and valving, however, can be included in the system for using mix tank 120 to also formulate the feed solution.

Preferably, the system illustrated in FIG. 6 is completely automated. In this regard, the system includes a controller 126 which can be, for instance, a microprocessor. As shown, controller 126 is in communication with almost all of the elements in the system, including all of the valves and pumps. In this manner, controller 126 can be used to automatically formulate feed solutions, dispense the feed solutions, formulate cleaning solutions, and clean the system components when desired.

Although a preferred embodiment of the present invention has been described using specific terms, devices, and methods, such description is for illustrative purposes only. The words used are words of description rather than of limitation. It is to be understood that changes and variations may be made by those of ordinary skill in the art without parting from the spirit or the scope of the present invention. In addition, it should be understood that aspects of various embodiments may be interchanged both in whole or in part.

What is claimed is:

1. A feed delivery system for orally administering a supplemental feed solution to a domestic animal comprising:
   a water source;
   a mixing station in communication with said water source, said mixing station for mixing said supplemental feed solution;
   a feeding station in communication with said mixing station, said feeding station including a trough for holding said supplemental feed solution and a plurality of spray nozzles for delivering said feed solution to said trough; and
   a disinfecting station in communication with said water source and said feeding station for dispensing a disinfectant solution into said feeding station.

2. The feed delivery system of claim 1, wherein said mixing station further includes a hopper, for storing dry supplemental feed, and a mixing tank, for mixing dry feed with water, said mixing tank communicating with said hopper, such that dry feed is received from said hopper into said mixing tank and mixed with water from said water source, producing a feed solution for administering orally to a domestic animal.

3. The feed delivery system of claim 1, wherein the feeding station comprises a double feeding station, said double feeding station arranged back-to-back.

4. The feed delivery system of claim 3, wherein the feeding station further includes a level indicating device for indicating the level of said feed solution in said trough, said level indicating device communicating with a controller for controlling the flow of feed solution therethrough, wherein the controller is configured to add feed when the level indicating device indicates the feed solution level is below a desired amount.

5. The feed delivery system of claim 1, wherein said trough includes a plurality of separator plates for dividing the trough into individual feeding areas.

6. The feed delivery system of claim 5, wherein said separator plates further include alternating slots, said alternating slots being configured to hold a bar, said bar being adjustably positioned in said slots to regulate the size of an opening in said individual feeding areas.

7. The feed delivery system of claim 5, wherein said trough further includes a lid, said lid moveable between a closed first position and a second open position relative to said trough, such that said lid in the closed first position prevents access to said trough to prevent contamination of said supplemental feed solution.

8. The feed delivery system of claim 7, wherein said lid is movable to said second open position responsive to a contact from said domestic animal.

9. The feed delivery system of claim 5, wherein said feeding station further includes a pivot bar, said pivot bar allowing a curtain to be suspended therefrom, said curtain preventing contamination from contacting said feed, said curtain pivoting inward on said pivot bar when an animal applies inward force to said curtain.

10. The feed delivery system of claim 1, wherein said feeding station further includes a plurality of legs, said legs having a threaded member and a baseplate, such that engaging the threaded member into the baseplate causes said feeding station to raise relative to a surface, while disengaging said threaded member from the baseplate causes the feeding station to lower relative to the same surface.

11. The feed delivery system of claim 1, wherein said feeding station further includes a drive mechanism attached to said trough, said drive mechanism causing said trough to tilt to empty the contents of said trough by the force of gravity.

12. The feed delivery system of claim 11, wherein said drive mechanism is an air cylinder.

13. The feed delivery system of claim 1, wherein said disinfecting station further includes a reservoir for holding disinfectant, said reservoir connected to a rinse line, said rinse line further including a plurality of spray nozzles such that disinfectant flowing through said rinse line is disbursed through said spray nozzles to disinfect said feeding station.

14. The feed delivery system of claim 1, wherein said supplemental feed solution is a powdered milk solution.

15. The feed delivery system of claim 14, wherein said supplemental feed solution further includes a supplement chosen from the group consisting of a vitamin supplement, a mineral supplement, a medicament, and a growth solution.

16. The feed delivery system of claim 1, wherein said domestic animal is chosen from the group consisting of swine, cattle, horses and goats.

17. The feed delivery system of claim 1, wherein said domestic animal is a piglet.

\* \* \* \* \*